FIG. I

INVENTORS
F. J. FUCHS, JR.
D. L. KIRSCHENMAN
BY MARN & JANGARATHIS
ATTORNEYS

Feb. 23, 1971 F. J. FUCHS, JR., ET AL 3,564,885
FLANGE FORMING APPARATUS
Filed Oct. 10, 1968 6 Sheets-Sheet 2

Feb. 23, 1971 F. J. FUCHS, JR., ET AL 3,564,885
FLANGE FORMING APPARATUS

Filed Oct. 10, 1968 6 Sheets-Sheet 6

United States Patent Office

3,564,885
Patented Feb. 23, 1971

3,564,885
FLANGE FORMING APPARATUS
Francis Joseph Fuchs, Jr., Princeton Junction, N.J., and Duane Le Roy Kirschenman, South Fork Township, Forsyth County, N.C., assignors to Western Electric Company, Incorporated, New York, N.Y., a corporation of New York
Filed Oct. 10, 1968, Ser. No. 766,484
Int. Cl. B21d 19/00
U.S. Cl. 72—60                                                                17 Claims

ABSTRACT OF THE DISCLOSURE

Apparatus for forming a projection, in particular a flange, on a plastically deformable member by flaring a portion of the member and by subjecting the member to pressure sufficiently high to place the member in a plastic state, or state of increased ductility, and to cause at least a portion of the member to flow thereby forming the projection. Pressure is applied to the plastically deformable member by the exertion of mechanical pressures by a plurality of radially retractable rams and a displaceable back-up die which defines one wall of a variable size die cavity.

BACKGROUND OF THE INVENTION

This invention relates to apparatus for forming projections, and more particularly to apparatus for forming projections on blanks of material which flows plastically when subjected to sufficiently high pressure, e.g., solid plastic material, and even more particularly, to apparatus for forming a flange on an end of a tubular blank of solid plastic material by subjecting the material to pressure sufficiently high that the tubular blank is placed in a plastic state, or state of increased ductility, and thereafter causing the blank material to flow and form a flange thereon.

It is known by those skilled in the art, that many metals and other materials increase in ductility, or have an increased capacity for deformation without fracture, when they are subject to high hydrostatic pressure. These metals and other materials are known as "solid plastic materials." This principle is treated in P. W. Bridgman "Large Plastic Flow and Fracture," published by McGraw-Hill Book Company of New York in 1952. Accordingly, it will be understood that the expression "solid plastic material," as used in this specification and claims, is used in this context.

Lengths of tubular members, for example waveguides, tubing and the like, are typically joined together by mechanically interlocking flanges formed on the ends of the tubular members. Generally, interlocking is accomplished by bolting the flanges together; however, it is also known to utilize welding or brazing for this purpose.

The provision of flanges on tubular members has been, in the past, an extremely expensive manufacturing process. As usage of flange members increases, the desirability of replacing such an expensive process with one which is equally as effective, yet less expensive is increased.

Prior art operations for forming flanges on tubular members have included spinning and flaring operations, cold extrusion techniques, molding and the like. As is known to those having skill in this art, the spinning and flaring operations have the inherent limitation that flanges of only very limited thickness as compared with the wall thickness of the tubular member itself can be formed. Thus, the thickness of a flange formed by the known spinning or flaring operations is invariably less than the original wall thickness of the tubular member itself, which condition becomes relatively worse as the size of the flange to be formed increases. With respect to the cold extrusion techniques, satisfactory results have not been achieved in that virtually all prior art cold extrusion techniques have the problem of radial fracture where the flange to be formed is of a relatively large diameter. The obvious disadvantages of molding include the necessity for heating the material and the associated high costs of maintaining a molding operation.

Recent developments accomplished by those concerned with the foregoing problems have indicated that methods of and apparatus for forming structurally sound flanges on tubular members are possible if the tubular member can be placed in a state of high hydrostatic pressure, i.e., a plastic state or a state of increased ductility, and maintained in such a state while a flange is being extruded on the tubular member. Such developments are discussed in great detail in the copending U.S. patent application to F. J. Fuchs, Jr., Ser. No. 461,250 for Methods of and Apparatus for Hydrostatic Extrusion, filed June 4, 1965, now abandoned, and assigned to the same assignee as is this application. Mr. Fuchs, in that application, discloses that flanges of a desired thickness and outer diameter can be extruded on tubular members by building up hydrostatic pressure in the material of the tubular member, which pressure is sufficiently high to increase the ductility of the material, i.e., place the material in a plastically deformable state, and extruding the material into an expandable or variable size die cavity, while maintaining the material in the plastically deformable state. Also, such a method has been found to enable the production of flanges on tubular members of a diameter and structural soundness never before achieved.

It is further suggested by Mr. Fuchs, that prior to placing the material of the tubular member in a state of high hydrostatic pressure, it is desirable to flare outwardly into a flange defining die cavity, the end portion of the tubular member on which the flange is to be formed. Such flaring assists in achieving the desired initial flow of the material by facilitating, environmentally, the build up of high hydrostatic pressure in the material which increases the capability of the material to flow uniformly into a flange defining die cavity. Flanges formed by such uniform flow have been found to be free of structural flaws and other imperfections which have heretofore precluded the formation of relatively large flanges on relatively small tubular members.

The apparatus of the present invention is directed to the utilization of the fundamental principles as disclosed by Mr. Fuchs in a commercially expedient flange forming apparatus.

SUMMARY OF THE INVENTION

The present invention, therefore, embodies apparatus for forming a projection (e.g., a flange) on a blank of material (e.g., solid plastic material) which flows plastically when subjected to sufficiently high pressure, or when sufficiently high hydrostatic pressure is built up in the material, which apparatus may include retractable apparatus for applying a transversely directed pressure against low friction pressure transmitting means for engaging the material and applying pressure thereto, and means for advancing the pressurized material through an extrusion die into a variable size die cavity, the combined effect of the pressurizing and advancing causing the material to flow plastically, or to be placed in a state of increased ductility, so as to facilitate flow of the material within the variable size die cavity to form the projection.

DETAILED DESCRIPTION

Figure 1:
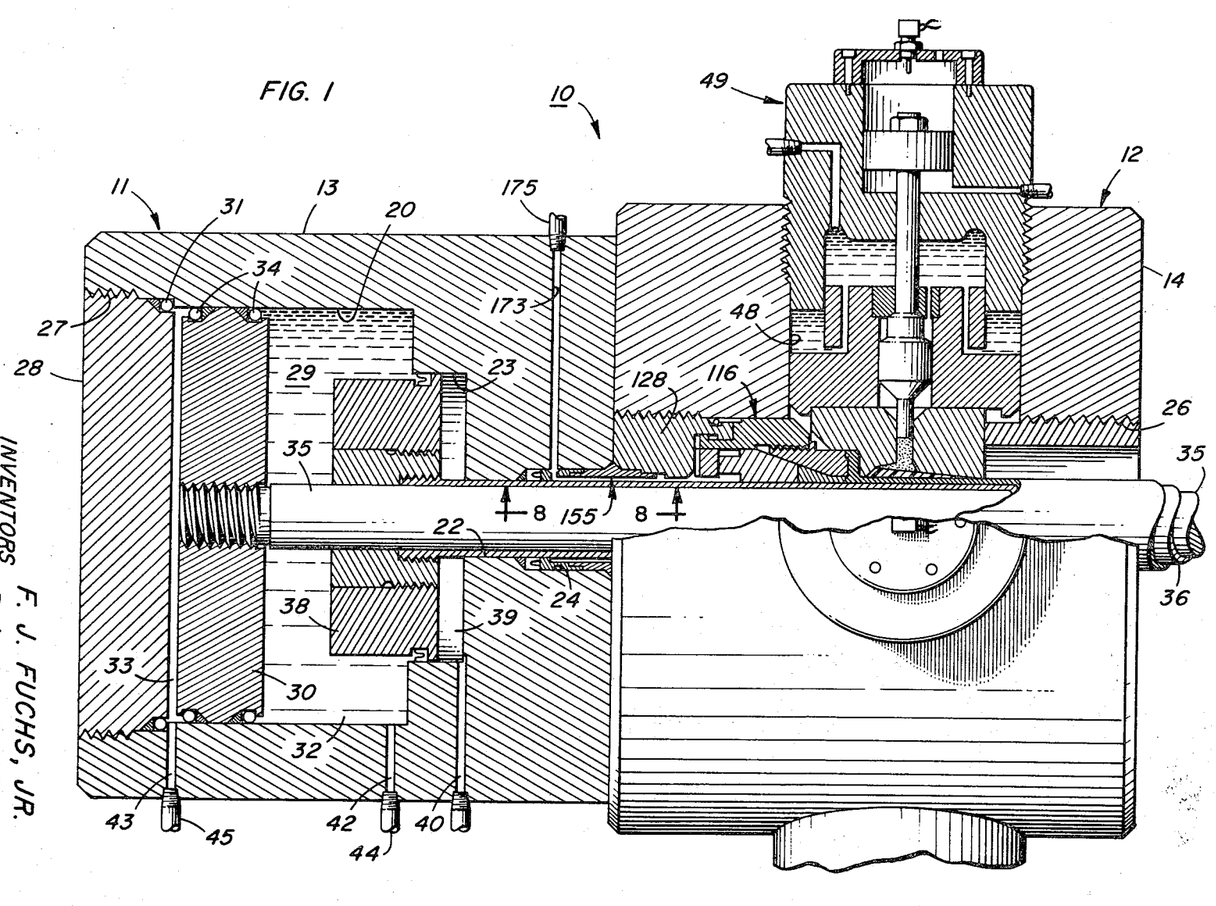
FIG. 1 is a plan view, partly in section of the apparatus under study.

Referring now to FIG. 1, the present invention will be taught specifically as embodied by a flange forming apparatus designated generally by the reference numeral 10, comprising a mandrel operating section and a high pressure forming section, designated generally by the reference numerals 11 and 12, respectively.

The main structural members of mandrel operating section 11 and high pressure forming section 12 are cylinder block 13 and machine block 14, respectively, which are secured together by suitable means (not shown) such as bolts. Cylinder block 13 is a generally cylindrical member having a first bore 20 extending longitudinally axially into one end thereof, a second bore 22 extending longitudinally axially into the other end thereof, and a third bore 23 extending between the first and second bores and of a diameter which is larger than the diameter of second bore 22, but smaller than the diameter of first bore 20. Second bore 22 is provided with a counter-bore 24 which, as will be discussed in detail below, defines an annular channel for mounting a seal to preclude leakage of pressurized fluid at the interface between cylinder block 13 and machine block 14. Machine block 14 of high pressure forming section 12 is also generally cylindrical (FIG. 7) and is provided with a longitudinally extending axial bore 26 therethrough, which bore 26 is coaxial with bores 20, 22 and 23 of cylinder block 13.

The open end of first bore 20 in cylinder block 13 is provided with threads 27 for securely receiving an end plug 28 therein to cooperate with first bore 20 to define a fluid chamber 29. End plug 28 is provided with a suitable pressure seal 31 around its inner periphery so as to establish a fluid tight seal with bore 20 to preclude leakage of fluid from chamber 29. Mounted in fluid chamber 29 for longitudinal axial reciprocation is a rod piston 30 which effectively divides chamber 29 into an upstream portion 32 (that portion of chamber 29 to the right of rod piston 30 as seen in FIG. 1), and a downstream portion 33 (that portion of chamber 29 to the left of rod piston 30 as seen in FIG. 1), which chamber portions vary in volume depending upon the axial position of rod piston 30 within chamber 29. Fluid communication between the upstream and downstream portions of chamber 29 is precluded by seals 34 mounted in suitable annular channels formed in the periphery of rod piston 30.

Rigidly secured for reciprocation with rod piston 30 is a mandrel rod 35 which extends longitudinally axially upstream from rod piston 30 through bores 23, 22 and 26. The upstream end of mandrel rod 35 is provided with a very slight conical taper which is adapted to cooperate with a corresponding taper on a juxtaposed concentric mandrel sleeve 36 which extends longitudinally coaxially with mandrel rod 35 from within bore 23 in cylinder block 13 upstream through bores 22 and 26. Because of the corresponding tapers on mandrel rod 35 and mandrel sleeve 36, relative axial movement therebetween results in engagement or disengagement of the respective tapered surfaces of the rod and sleeve. Engagement of the rod and sleeve causes the sleeve to be expanded outwardly within the elastic limit of the sleeve material, and disengagement of the rod and sleeve allows the sleeve to contract, resiliently to its normal diameter. Expansion of mandrel sleeve 36 is utilized in securing a tubular blank within the apparatus. Thus, a tubular blank can be slipped into the apparatus over mandrel sleeve 36 and positioned as desired. Once positioned the sleeve is expanded within the blank so as to securely engage the inner surface of the blank for forming. After the forming operation is complete, the mandrel sleeve is allowed to contract to facilitate removal of the flanged tube. Additionally, as will be discussed below in detail, the outer surface 37 of mandrel sleeve 36 is rough or otherwise textured to preclude slip between the mandrel sleeve 36 and a blank secured therein during the flange forming operation.

Threadedly secured to the downstream end of mandrel sleeve 36, and slidably mounted for longitudinal axial reciprocation on mandrel rod 35 is a sleeve piston 38, the outside diameter of which is substantially equal to the diameter of third bore 23 of cylinder block 13. Sleeve piston 38 is slidably received within third bore 23 and cooperates therewith to define a chamber 39 which may be in communication with a suitable source of pressurized fluid (not shown) through a suitable passage 40 formed in cylinder block 13. Passage of fluid from the upstream portion 32 of fluid chamber 29 to the chamber 39 is precluded by a suitable seal 41 mounted in an annular channel formed in the periphery of sleeve piston 38.

In addition to passage 40, there are also formed in cylinder block 13, fluid passages 42 and 43 which provide for the communication of fluid into and out of the upstream and downstream portions 32, 33 respectively, of fluid chamber 29. Fluid passages 42, 43 are connected to a suitable source of pressurized fluid (not shown) through fluid lines 44 and 45 respectively.

Machine block 14 of high pressure forming section 12 is provided with four substantially centrally disposed bores 48 (FIG. 7) which extend radially outwardly through machine block 14 from axial bore 26. The center lines of bores 48 define a common plane which is normal to the longitudinal axis of bore 26, and each is radially displaced from the next adjacent bore centerline by an angle of 90°.

Figure 2:
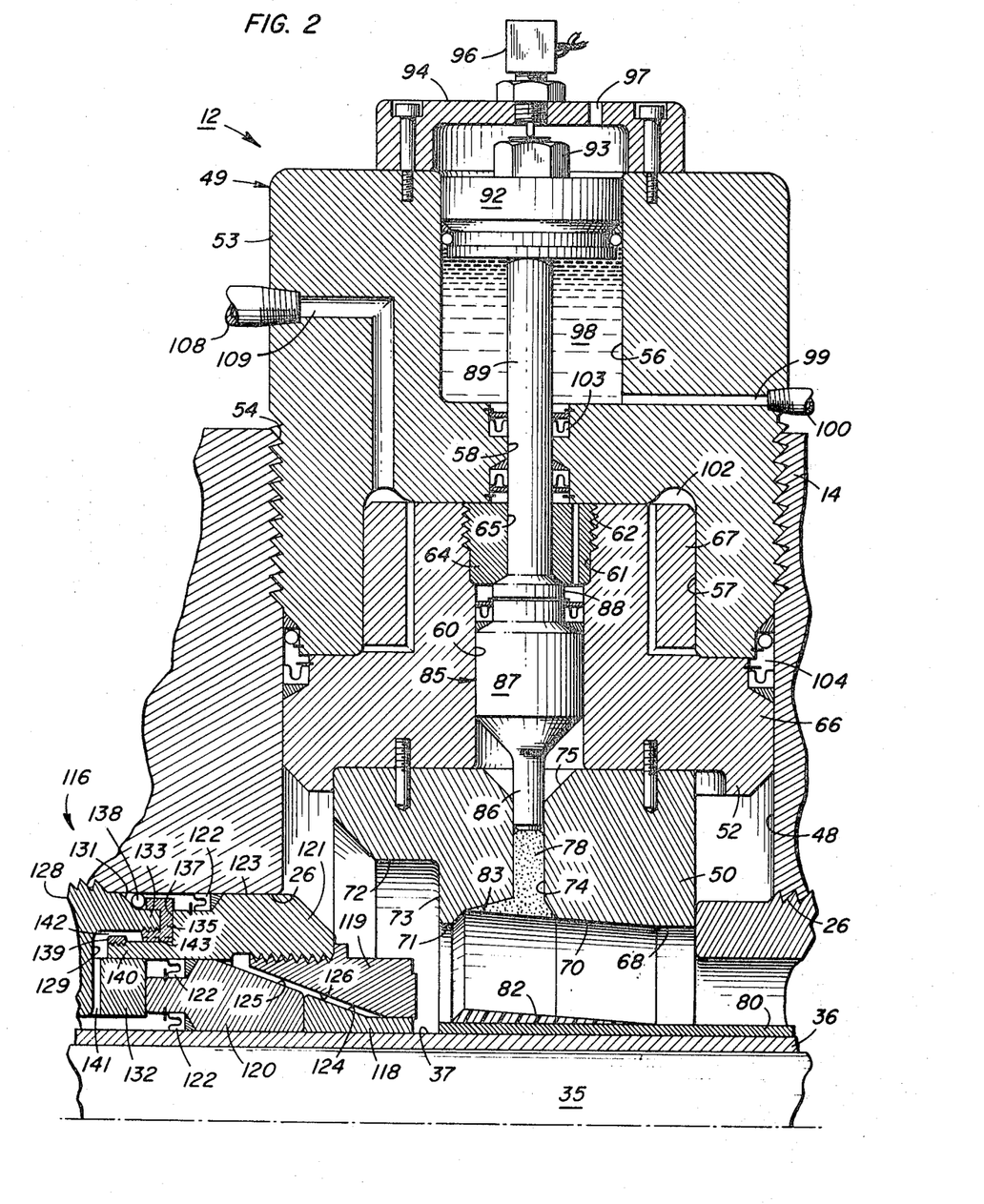
FIG. 2 is a cross-sectional plan view of a portion of FIG. 1 showing the apparatus at the initial stage of its cycle.
Figure 5:
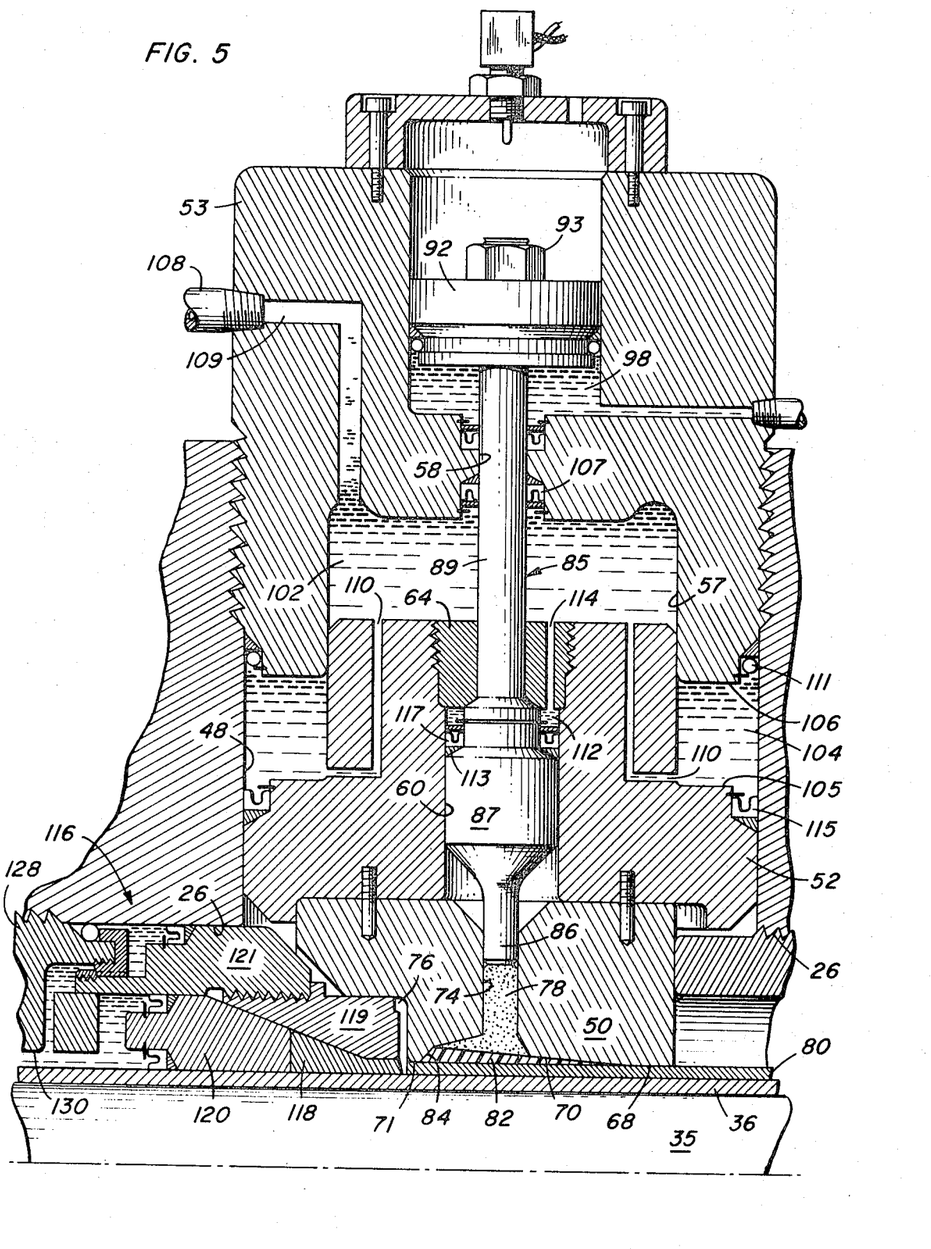
FIG. 5 is a view similar to FIG. 2, but showing the blank as being radially clamped in place.
Figure 6:
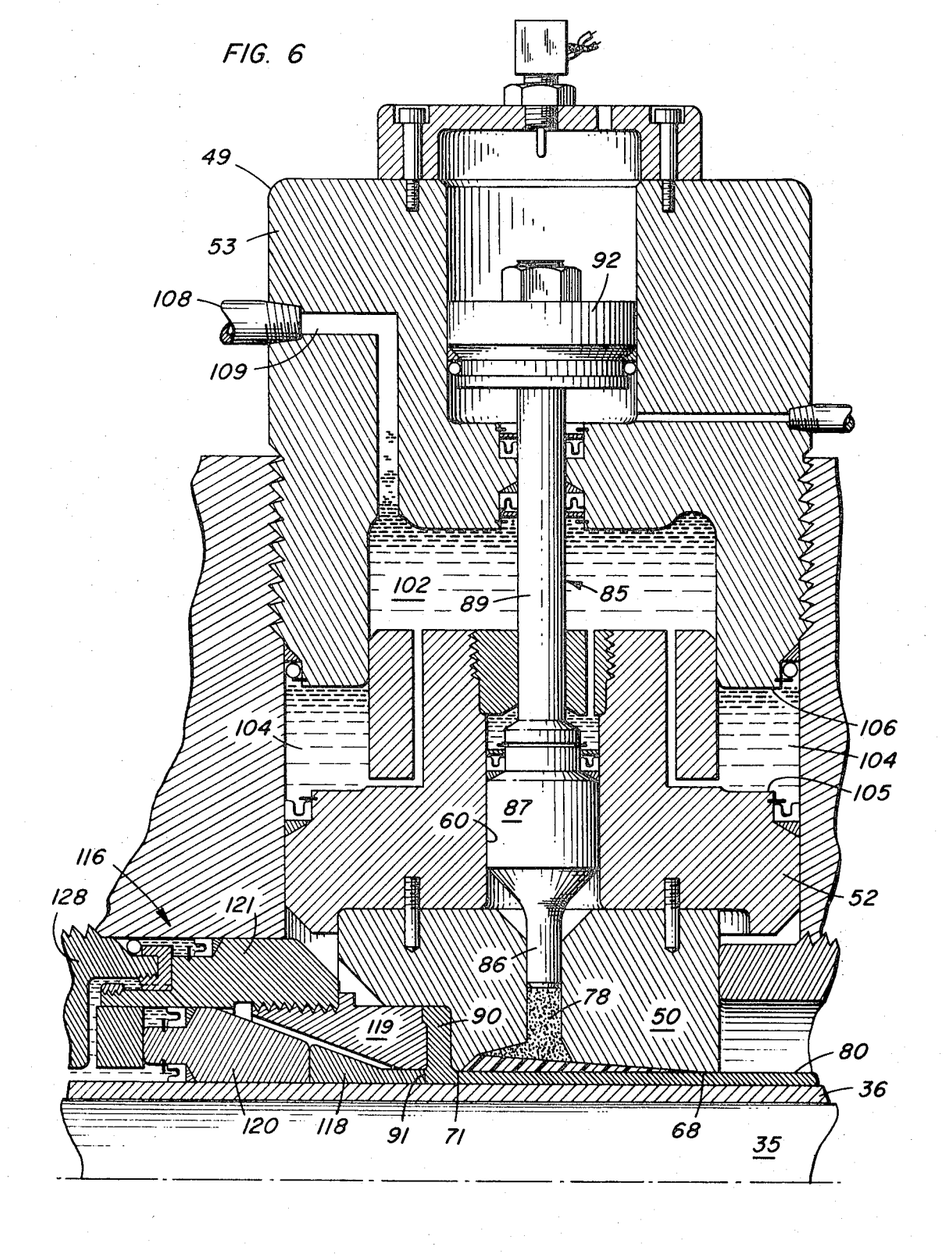
FIG. 6 is a view similar to FIG. 2, but showing the blank as having a flange formed thereon.

Provided in each radial bore 48 is a radial force ram apparatus, designated generally by the reference numeral 49. Referring to FIGS. 2, 5 and 6, it can be seen that the radially most inward element of the radial force ram apparatus 49 is a clamp die 50 which is suitably secured, such as by bolts, to a clamp die piston 52. As will be discussed in greater detail, the clamp die 50 and clamp die piston 52 are mounted within bore 48 for reciprocation between an advanced or operational position (FIGS. 5 and 6) and a retracted position (FIG. 2). The clamp die 50 and clamp die piston 52 of each radial force ram apparatus 49 is retained within its associated radial bore 48 by a clamp piston cap 53 which is rigidly secured, as by threads 54 within the bore 48.

Clamp piston cap 53 is a generally cylindrical member having an outer first axial bore 56, an inner second axial bore 57 and a centrally disposed third axial bore 58 extending between the first and second axial bores 56 and 57 respectively. Clamp die piston 52 is provided with an axial bore 60 extending therethrough, which bore 60 has an axial counterbore 61 extending inwardly from its outer end. Counterbore 61 is provided with threads 62 for rigidly receiving an annular guide sleeve 64 therein, which annular guide sleeve has an axial bore 65 extending therethrough. The lower portion 66 of clamp die piston 52 is generally cylindrical and slidably received within radial bore 48. The upper portion 67 of clamp die 52 is relieved to define a cylindrical portion 69 which is slidably received within the second axial bore 57 of clamp piston cap 53.

Figure 7:
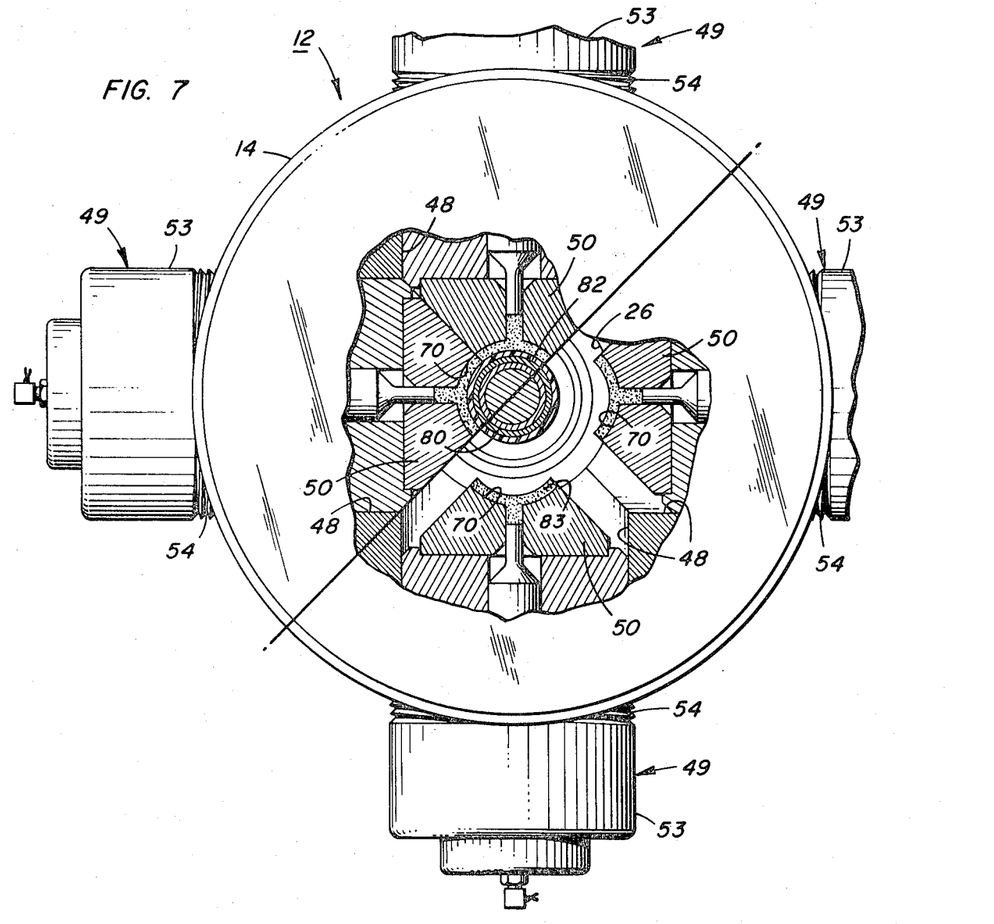
FIG. 7 is a cross-sectional view of the apparatus under study showing the clamping pistons in both the clamping (upper left) and retracted (lower right) positions.

As can be best seen from FIG. 7, clamp die 50 is generally triangular in radial cross-section with an arcuately relieved surface 68 (FIGS. 2, 5, 6) for making clamping engagement with a blank 80 to be flanged. Formed in the face of arcuately relieved surface 68 is an annular channel 70 (FIG. 2) of irregular axial cross-section for accommodating a generally cylindrical sleeve 82 of suitable low friction pressure transmitting material such as Teflon, which sleeve is surrounded by a generally cylindrical body 83 of pressure transmitting material such as urethane.

Considering the direction of movement of the mandrel and blank during flange forming as being from upstream to downstream (i.e., right to left as seen in FIG. 1), the downstream end of clamp die 50 is provided with an arcuate channel 72 (FIG. 2) which defines a substantially radially extending shoulder 73 between channel 72 and clamping surface 68. The surface of arcuate channel 72 defines the peripheral surface of a die cavity 76 (FIG. 5) which determines the configuration of a flange 90 (FIG. 6) to be formed on blank 80 during the forming operation. The surface of shoulder 73 defines another wall of die cavity 76 which wall is for forming the tube-adjacent surface of a flange 90.

As will be discussed below in detail, the remaining surfaces of die cavity 76 are defined by the outer surface 37 of mandrel sleeve 36 and the upstream surfaces of a pair of concentrically oriented back-up dies 118 and 119 which are axially displaceable from their positions as shown in FIG. 5 to their positions as shown in FIG. 6. Thus, it can be seen that flange defining die cavity 76 is formed by the cooperation of cylindrical surfaces 72 and 37 of clamp die 50 and mandrel 36, with radial surface 73 of clamp die 50 and the upstream surfaces of back-up dies 118 and 119. Further, as was noted above, back-up dies 118 and 119 are axially displaceable, thus allowing the size of die cavity 76 to be varied from a relatively small volume cavity (FIG. 5) to a relatively large volume cavity (FIG. 6).

As may be best seen in FIG. 2, annular channel 70 in the relieved surface 68 of clamp die 50 divides surface 68 into an upstream section and a downstream section. The downstream section defines an extrusion die 71 through which material from tubular blank 80 is extruded into variable size die cavity 76 during a flange forming operation.

Formed in clamp die 50, coaxially with bores 56, 58, 60 and 65, is a bore 74 extending through clamp die 50 from annular channel 70 to a conical counterbore 75 which extends into die 50 from the radially outer surface thereof. The radially inward portion of bore 74 is for accommodating a plug 78 of suitable material such as urethane to serve as a pressure transmitting medium for the cylindrical body 83 as will be discussed in detail below.

Slidably mounted for reciprocation within bores 56, 60, 65 and 74 is a pressure intensified, designated generally by reference numeral 85, comprising a plunger 86 which is slidably received within bore 74, an intensifier piston 87 which is outwardly adjacent plunger 86 and slidably received within bore 60, a stop element 88 which is outwardly adjacent piston 87 and comprises a cylindrical portion being of smaller diameter than the diameter of bore 60 but of larger diameter than the diameter of bore 65 so as to cooperate with guide sleeve 64 to limit the radially outward movement of pressure intensifier 85, and a rod 89 which is outwardly adjacent stop element 88 and slidably received within bores 65 and 58 to extend into a chamber defined by bore 56. It is to be understood that pressure intensifier 85 may be a single unit or it may be a rod having the appropriate larger diameter elements suitably mounted thereon. A piston 92 is suitably secured such as by nut 93 to the end of rod 89 for reciprocation within bore 56.

The upper end of bore 56 is closed by a cap 94 which is rigidly secured to clamp piston cap 53 by suitable means such as bolts. A switch 96 is mounted centrally of cap 94 to act as an indicator for the radially outwardly movement of intensifier 85, and the interior of cap 94 is suitably vented through a passage 97 provided therethrough.

As will be discussed below, switch 96 is electrically connected to an operator's control circuit (not shown). Thus, if rod 89 is displaced radially outwardly by a sufficient amount to engage and actuate switch 96, the operator's control circuit is actuated to indicate that all radial clamps have been extended and that the mandrel sleeve may then be released and the flanged product removed.

As may be best seen in FIGS. 2, 5, and 6, intensifier 85, clamp piston cap 53 and bore 48 cooperate to define a plurality of fluid tight chambers to which high pressure fluids are selectively introduced. More specifically, the lower surface of piston 92 cooperates with bore 56 to define a chamber 98 which communicates with a source of intermediate pressure fluid, e.g., 5,000 p.s.i., through a passage 99 in clamp piston cap 53 and a suitable fluid line 100 which is threadedly received within passage 99. The pressurized fluid is precluded from leaking out of chamber 98 past piston 92 by a seal 101 mounted in a suitable annular channel formed in the peripheral surface of piston 92. Similarly, pressurized fluid is precluded from leakage past rod 89 through bore 58 by a seal 103 mounted in a suitable annular channel formed in the upper surface of bore 58.

In addition to fluid chamber 98 formed as discussed above, clamp die piston 52, clamp piston cap 53 and bore 48 cooperate to define two chambers 102, 104 for high pressure fluid, e.g., 40,000 p.s.i., the first chamber 102 being defined by the upper portion 67 of clamp die piston 52, and bore 57 of clamp piston cap 53, and the second chamber 104 being an annular chamber defined by bore 48, the upper surface 105 of the lower portion 66 of clamp die piston 52 and the lower surface 106 of clamp piston cap 53.

As can be best seen in FIGS. 5 and 6, leakage of high pressure fluid from chamber 102 through bore 58 is prevented by the provision of a high pressure seal 107 mounted around rod 89 in a suitable annular channel formed in the radially inner surface of bore 58. Similarly, leakage of high pressure fluid from chamber 104 past clamp piston cap 53 through bore 48 by a high pressure seal 111 mounted in an annular channel formed in the lower peripheral extremity of clamp piston cap 53, and from chamber 104 past clamp die piston 52 through bore 48 by a high pressure seal 115 mounted in a suitable annular channel formed in the upper peripheral surface of the lower portion 66 of clamp die piston 52.

Referring now to FIG. 5, it can be seen that high pressure fluid is introduced to chamber 102 through fluid source line 108 which is appropriately secured to a passage 109 in clamp piston cap 53. High pressure fluid in chamber 102 communicates with chamber 104 through a plurality of passages 110 in clamp die piston 52 so that the pressure in fluid chambers 102 and 104 is, for all practical purposes equal.

In addition to chambers 102 and 104, a third high pressure fluid chamber 112 is defined by the upper surface 113 of intensifier piston 87, bore 60 in clamp die piston 52 and the lower surface of annular guide sleeve 64. Chamber 112 communicates with high pressure fluid chamber 102 through a passage 114 in annular guide sleeve 64, and leakage of high pressure fluid from chamber 112 past intensifier piston 87 through bore 60 is prevented by a high pressure seal 117 mounted around stop element 88 in abutting engagement with the stepped upper surface 113 of piston 87.

Downstream of clamp die 50 and operatively mounted within axial bore 26 is a back-up or face die system designated generally by the reference numeral 116. Referring therefore to any of FIGS. 2, 5 and 6, back-up die system 116 is seen to comprise an inner back-up die 118, an outer back-up die 119 and inner and outer back-up die pistons 120, 121 for positioning the inner and outer back-up dies 118, 119 respectively. Inner back-up die 118 and inner back-up die piston 120 are generally cylindrical so as to be slidably received around mandrel sleeve 36. Outer back-up die 119 and outer back-up die piston 121 are also generally cylindrical, the outer surface 123 of piston 121 being slidably received within the axial bore 26 of machine block 14. Inner back-up die 118 and its associated piston 120 are provided with supplementary tapered surfaces 124, 125 which cooperate with a complementary tapered surface 126 on outer back-up die 119 to limit relative axial movement therebetween.

The downstream end of bore 26 is provided with threads for receiving a threaded plug 128 which retains the back-up die system 116 within bore 26. Threaded plug 128 is provided with an axially extending bore 130 which is coaxial with bore 26 in machine block 14, and of a diameter slightly larger than mandrel sleeve 36 so as to cooperate therewith to define a cylindrical chamber 164 (FIG. 8) for the passage of pressurized fluid to back-up die system 116, as will be discussed.

Referring to FIG. 2, the upstream end of plug 128 is provided with two radially displaced, concentric annular channels 129, 131 which define a pair of radially spaced, concentric shoulders 132, 133. Radially inner shoulder 132 serves as a stop for limiting the downstream movement of inner back-up die piston 120. Outer shoulder 133 is provided with threads on its radially inward surface for receiving an annular stop ring 135. Stop 135 is generally U-shaped in cross-section and is sized to receive shoulder 133 therein so as to be threadedly secured thereto. Stop ring 135 serves three functions, viz, it cooperates with a radial surface 137 of outer back-up die piston 121 to limit the downstream movement thereof within axial bore 26, it serves as a seal retainer for a pressure seal 138 between plug 128 and bore 26, and it cooperates with a stop ring 139 which is threadedly mounted on an annular lip 140 of outer back-up die piston 121 to limit the upstream movement of back-up die piston 121 and outer back-up die 119 (FIG. 5). Further, by limiting the upstream movement of outer back-up die 119, the limits of upstream movement by inner back-up die 118 and its associated piston 120 are also limited by the engagement of their tapered surfaces 124, 125 respectively with the complementary tapered surface 126 of outer back-up die 119.

As will be discussed in detail with respect to the operation of the apparatus of the present invention, inner and outer back-up dies 118, 119 are displaced from their most upstream positions (FIG. 5) to their most downstream positions (FIG. 6) during the actual flange forming operation. This displacement is against a back-pressure created by a fluid medium acting against the downstream surfaces of the inner and outer back-up die pistons 120, 121 respectively. In order to allow free circulation of the fluid medium against the back-up die pistons, shoulder 132, stop ring 139 and stop ring 135 are each provided with a plurality of fluid passages 141, 142 and 143 respectively. Fluid passing through these passages allows fluid pressure to be generated within channel 129 against the radial surface of annular lip 140 of outer back-up die piston 121, and against the radial surface 137 of outer back-up die piston 121. Leakage of pressurized fluid from behind back-up die pistons 120, 121 is prevented by the provision of three suitable annular seals 122, one mounted in a suitable annular channel in the outer surface of outer back-up die piston 121 to seal the interface between piston 121 and bore 26, a second mounted in a suitable annular channel formed in the outer peripheral surface of inner back-up die piston 120 to seal the interface between back-up die pistons 120, 121, and the third mounted in a suitable annular channel formed in the inner peripheral surface of inner back-up die piston 120 to seal the interface between back-up die piston 120 and the outer surface of mandrel sleeve 36.

Figure 8:
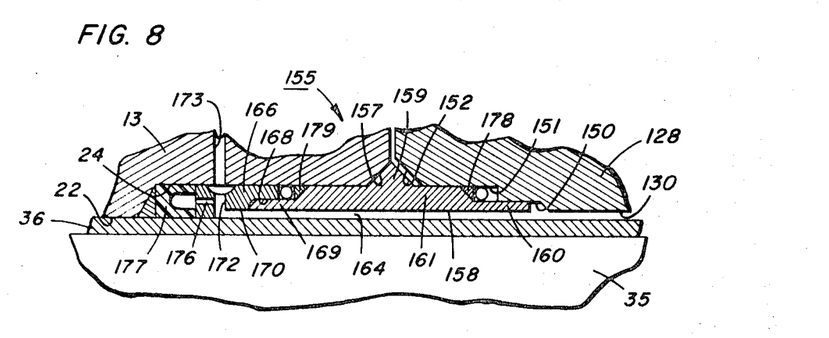
FIG. 8 is an enlarged, partial cross-sectional view of the seal structure indicated by arrows 8—8 as shown in FIG. 1.

Referring now to FIG. 8, it can be seen that bore 130 in threaded plug 128 is provided with three coaxial, stepped counterbores 150, 151 and 152 which extend axially from the downstream end of plug 128, and cooperate with counter-bore 24 in cylinder block 13 to define an annular channel for receiving a seal assembly, designated generally by the reference numeral 155 to preclude the leakage of pressurized fluid at the interface between cylinder head 13 and machine block 14. Counter-bore 150 is of slightly larger diameter than and in communication with bore 130, counter-bore 151 is of slightly larger diameter than and in communication with counter-bore 150, and counter-bore 152 is a tapered counter-bore extending from the downstream radial surface of plug 128 to counter-bore 151. Additionally, counter-bore 24 in cylinder block 13 is provided with a tapered counter-bore 157 which cooperates with tapered counter-bore 152 in plug 128 to define an annular, triangular channel for receiving a portion of a sealing member 158.

Sealing member 158 comprises an annular ring having a stepped cross-sectional configuration with stepped portions 160 and 161 being of diameters suitable for snug receipt within counter-bores 150, 151 and 24 respectively. Further, a generally outwardly extending triangular portion 159 is adapted for receipt within the channel defined by tapered counter-bores 152, 157 as noted above. The inside diameter of sealing member 158 is substantially equal to the diameter of bore 130 in plug 128 so as to cooperate with mandrel sleeve 36 in defining an annular channel 16 for the passage of fluid to back-up die system 116.

Snugly mounted within counter-bore 24 in cylinder block 13 is a retaining cylinder 166 which has an inside diameter which is substantially equal to the outside diameter of mandrel sleeve 36 for sliding engagement therewith. Retaining cylinder 166 is provided with a first counter-bore 168 which fits snugly between a stepped portion 169 of sealing member 158 and counter-bore 24, and a second counter-bore 170 formed inwardly of first counter-bore 168 and which corresponds in diameter to the inside diameter of sealing member 158. A radially extending passage 172 is formed in retaining cylinder 166 to provide communication between a passage 173 formed in cylinder block 13 and the annular channel 164. Passage 173 communicates with a high pressure fluid source line 175 (FIG. 1) which it ultimately connected to a source of high pressure fluid (not shown). Thus it can be seen that high pressure fluid, e.g., 40,000 p.s.i. is provided to back-up die system 116 from source line 175 (FIG. 1) through passages 173 and 172 into annular channel 164 which is in fluid communication with back-up die system 116.

In addition to radially extending passage 172, retaining cylinder 166 is provided with an axially extending passage 176 which provides for the passage of high pressure fluid from radial passage 172 to a high pressure seal assembly 177 which is mounted in counter-bore 24 downstream of retaining cylinder 166. Thus, as high pressure fluid is introduced through passage 173, it not only passes through passage 172 to annular channel 164, it also passes through axial passage 176 to actuate seal assembly 177 to preclude downstream leakage of fluid from annular channel 164 around mandrel sleeve 36.

Additionally, mounted between the stepped portions 160, 169 of sealing element 158 and the inner surfaces of counter-bores 151, 24 respectively, are a pair of high pressure seals 178, 179 which preclude leakage of high pressure fluid at the interface of cylinder block 13 and machine block 14 from annular channel 164.

The operation of the apparatus of the present invention includes three basic phases, viz, the materials handling phase wherein the apparatus is oriented as shown in FIG. 2 and FIG. 7 (lower half) to facilitate removal of a flanged tube or the insertion of a tube blank to be flanged, the clamping phase wherein the apparatus is oriented as shown in FIG. 5 and FIG. 7 (upper half) and the tube blank is securely maintained in position by the action of the clamping die and the expanded mandrel sleeve, and the forming phase wherein the apparatus is oriented as shown in FIG. 6, pressure is intensified on the blank, and the blank material is advanced into the die cavity by the mandrel so as to place the blank material in a state of high hydrostatic pressure or increased ductility whereafter further advancement of the blank material into the die cavity causes it to flow and herein to form a flange on the tube as desired.

Considering initially the materials handling phase, it can be seen from FIG. 2 that the clamp die 50 and clamp die piston 52 are in a retracted position, i.e., they are positioned radially outwardly within bore 48. This positioning is achieved by relieving the pressure in the high pressure source line 78 so as to relieve the pressure in fluid chambers 102, 104 and 112 while at the same time impressing intermediate pressure on the fluid in chamber 98 through passage 99 from fluid line 100. Piston 92 is forced upwardly by the action of fluid in chamber 98 to initially cause the stop element 88 of pressure intensifier 85 to engage annular guide sleeve 64, and thereafter to cause upward movement of stop element 88, clamp die piston 52 and clamp die 50, all of which are rigidly interconnected, until the upper surface 105 of clamp die piston 52 engages the lower surface 106 of clamp piston cap 53.

With the apparatus oriented for materials handling, a flanged tube can be removed from the mandrel sleeve by sliding the flanged tubular blank to the right as seen in FIG. 2, since the clamp die 50 is retracted sufficiently far to preclude interference with the newly formed flange during removal. Once a completed workpiece has been removed, a new tubular blank can be moved into position on mandrel sleeve 36.

Although the operation of the present apparatus contemplates the use of a cylindrical pressure transmitting sleeve, such as sleeve 82, which can be positioned on the tubular blanks prior to their introduction into the apparatus, it is to be recognized that other arrangements, such as a segmented sleeve associated with clamp die 50, are considered to be within the scope of the present invention.

Once a new blank 80 is positioned on mandrel sleeve 36, the materials handling phase of the operation is complete and the clamping phase commences. The first step of the clamping phase is to cause mandrel sleeve 36 to be expanded outwardly so as to securely engage the inner surface of tubular blank 80. In this regard, it was noted above that the outer surface to the upstream end of mandrel rod 35 is provided with a very slight conical taper which is adapted to cooperate with a corresponding taper on the inner surface of concentric mandrel sleeve 36 in response to relative axial movement between mandrel rod 35 and mandrel sleeve 36. This relative axial movement between mandrel rod 35 and mandrel sleeve 36 causes engagement or disengagement of the respective tapered surfaces of the rod and sleeve which cause, respectively, expansion or contraction of the mandrel sleeve within a tubular blank which has been positioned concentrically thereover.

Figure 3:
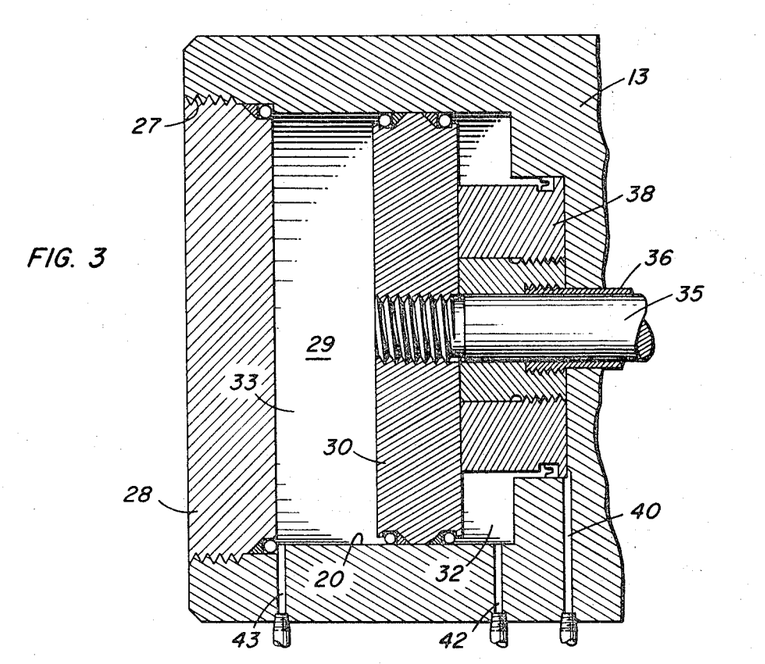
FIGS. 3 and 4 are cross-sectional views of the rod piston and sleeve piston at the blank-loose and blank-secured positions respectively.
Figure 4:
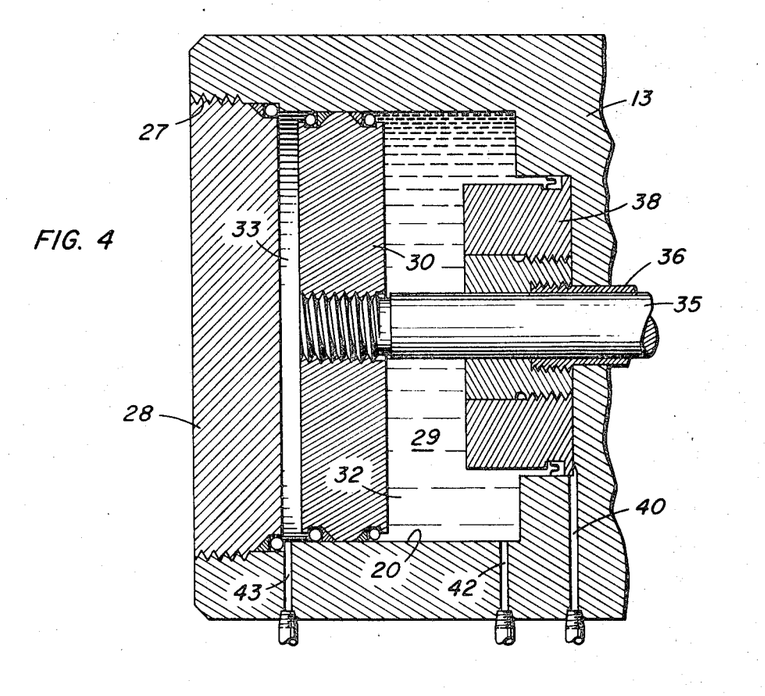

Referring to FIGS. 3 and 4, it can be seen that in FIG. 3 the rod piston 30 is positioned to the right within fluid chamber 29, in substantial surface-to-surface engagement with sleeve piston 38. Thus, mandrel rod 35 is positioned rightwardly within sleeve 36 causing disengagement of the tapered surfaces of the rod 35 and sleeve 36 and resilient contraction of mandrel sleeve 36. The mandrel sleeve 36 is maintained in the contracted position throughout the materials handling phase so that a flanged tube can be removed or a new tubular blank provided by sliding off or on the mandrel sleeve as required. Once a new tubular blank is positioned within the apparatus over sleeve 36, fluid pressure is relieved in chambers 33 and 39 and pressurized fluid is introduced to the upstream portion 32 of chamber 29. The pressurized fluid causes rod piston 30 and therewith rod 35 to be displaced to the left as seen in FIGS. 3 and 4, to the position shown in FIG. 4 while maintaining sleeve piston 38 and sleeve 36 stationary. The relative movement between the mandrel rod 35 and mandrel sleeve 36 causes engagement of the complementary tapered surfaces thereof and the resilient expansion of mandrel sleeve 36 within tubular blank 80 (FIG. 5) so as to rigidly secure together, as one, the mandrel rod 35 and its piston 30, the mandrel sleeve 36 and its piston 38, and the blank. Thereafter, any continued leftward movement of rod piston 30 as seen in FIG. 4, causes a movement of all elements secured thereto. The value of this structural interrelationship will become apparent during the consideration of the forming phase of the operation.

With the blank 80 rigidly secured to mandrel sleeve 36, and with intermediate pressure maintained on the fluid in chamber 98, high pressure fluid is introduced to high pressure fluid chambers 102, 104, 112 through fluid line 108 and passage 109. The effect of such high pressure fluid acting on the upper surfaces of clamp die piston 52 is to cause downward displacement within bore 48 of the clamp die piston 52, clamp die 50 and pressure intensifier 87 against the pressure of the fluid in chamber 98 acting against piston 92. In this regard, it is to be noted that a desired pressure on the fluid in chamber 98 is maintained at a substantially constant value notwithstanding the downward displacement of piston 92, by suitable valving (not shown) in the intermediate pressure fluid system.

Downward displacement of clamp die 50 against the upwardly directed force generated by the intermediate pressure fluid in chamber 98 causes the cylindrical clamping surfaces 68 of clamp die 50 to engage tubular blank 80 and to secure the blank rigidly in operational position against mandrel sleeve 36. It is to be noted, however, that full radial pressure is not impressed on the blank 80 in that the downwardly directed force of the high pressure fluid in fluid chamber 112 against pressure intensifier 85, is offset by the upwardly directed force generated by the intermediate pressure fluid in chamber 98 against piston 92 and therethrough to pressure intensifier 85. Thus, at this clamping stage of the operation, the net force exerted by plunger 86 against the urethane plug 78 is equal to the pressure of the fluid in chamber 112 multiplied by the projected horizontal area of the upper surface 113 of intensifier piston 86 minus the pressure of the fluid in chamber 98 multiplied by the area of the lower surface of piston 92 which is exposed thereto.

Concurrently with the introduction of high pressure fluid into fluid chambers 102, 104 and 112, high pressure fluid is also introduced to back-up die system 116 through annular channel 164 and passage 173 (FIG. 1) from high pressure fluid line 175 (FIG. 1). The introduction of high pressure fluid at this time causes high pressure to be exerted against the downstream surfaces of inner and outer back-up die pistons 120, 121 causing them to be displaced to the right, i.e., in the upstream direction, from the position shown in FIG. 2 to the position shown in FIG. 5. As can be clearly seen in FIG. 5, the upstream movement of outer back-up die piston 121 is limited by the engagement of the upstream surface of stop ring 139, which is rigidly secured to the annular lip 140 of outer back-up die piston 121, with the downstream surface of annular stop ring 135, which is rigidly secured to the concentric shoulder 133 of threaded plug 128. The limitation of the upstream movement of back-up die piston 121 is effective as to back-up die 119 in that they are rigidly, threadedly engaged. Accordingly, the same upstream movement limitation is imparted to inner back-up die 118 and inner back-up die piston 120 by the engagement of tapered surfaces 124, 125 of the inner back-up die 118 and its piston 120, respectively, with the complementary tapered surface 126 of outer back-up die 119. Thus, upon the introduction of high pressure fluid to the back-up die system 116 during the clamping phase of the operation of the present apparatus, the outer back-up die 119 with its piston 121 is displaced upstream to the limit of its movement as defined by the engagement of stop ring 139 with annular stop ring 135, and inner back-up die 118 with its piston 120 is displaced upstream to the limit of its movement as defined by the engagement of tapered surfaces 124 and 125 with tapered surface 126. As will become more clear during the description of the forming phase of operation of the present apparatus, the displacement of the inner back-up die 118, and its related piston 120 is greater than the displacement of the outer back-up die 119 and its related piston 121 by an amount sufficient to define an inner face on the flange being formed.

With blank 80 firmly clamped in place by the action of expanded mandrel sleeve 36 cooperating with clamping die 50, and with the elements of back-up die system 116 in their upstream positions, the apparatus is suitably arranged for the commencement of the forming phase of the operation.

The first step in the forming phase of the operation of the present apparatus is the introduction of high pressure against the blank 80 through the low friction, pressure transmitting sleeve 82. This is accomplished by relieving the pressure in the fluid in chamber 98 thereby eliminating the upwardly directed force component on piston 92 and pressure intensifier 85. In the absence of the restraining effect of this upwardly directed force, the full downward effect of the force generated by the high pressure fluid in fluid chamber 112 acting against the upper surface 113 of intensifier piston 87 is transmitted to plug 78 through plunger 86. The force is then transmitted through plug 86 and urethane body 83 to the pressure transmitting sleeve 82, wherethrough it is applied to pressurize the blank 80.

Sleeve 82 is a low friction, pressure transmitting sleeve which is cylindrical and has a generally triangular cross-sectional configuration, as shown. As noted above, the sleeve may be a single element or, for convenience of manufacture and operation, it may comprise plural segments as desired. The function of sleeve 82 is to encircle tightly, yet slidably, tubular blank 80 so as to create a high pressure, low friction engagement therewith. The sleeve can be manufactured from any deformable, resilient material which demonstrates an extremely low coefficient of friction. In this regard, it has been found that Teflon is a material which possesses these desired characteristics and that low friction, high pressure sleeves manufactured from Teflon are satisfactory.

As plunger 86 advances into bore 74, it compresses plug 78 and body 83 which, because of their resiliently plastic nature, transmit the pressure generated by plunger 86 substantially equally against the entire surface of sleeve 82 against which body 83 bears. This pressure causes sleeve 82 to be forced or squeezed into a high pressure engagement with the tubular blank 80. However, since the material of sleeve 82 exhibits an extremely low coefficient of friction, e.g., Teflon, the tubular blank 80 may slide easily internally of the sleeve notwithstanding the high degree of radial pressure being exerted against the blank thereby.

As discussed above, body 83 which may be manufactured from material such as urethane, exerts a high pressure substantially equally against the entire surface of sleeve 82 against which it bears. It is to be noted, however, that certain portions of the outer surface of sleeve 82 are not exposed to the pressurized urethane, viz, a small portion of the downstream outer surface and a large portion of the upstream outer surface. That portion of the downstream outer surface of sleeve 82 which is not exposed to urethane body 83 abuts the downstream surface 84 of annular channel 70. This reaction surface, in cooperation with the increased thickness of sleeve 82 at this point, acts to support the sleeve 82 against axial displacement during deformation of the blank 80. Such displacement would be in response to frictional forces generated between the outer surface of tubular blank 80 and the inner surface of sleeve 82 notwithstanding the extremely low coefficient of friction of desirable sleeve material. That portion of the upstream outer surface of sleeve 82 which is not exposed to urethane body 83 defines a sleeve segment in which a pressure gradient is established. Thus, the pressure exerted by sleeve 82 against tubular blank 80 diminishes from a maximum value exerted by that portion of the sleeve which is directly radially inwardly of urethane body 83 to little or no pressure at all at some point along the sleeve upstream from the area of maximum pressure. The nature of the gradient established is a function of configuration of the sleeve, frictional forces generated between the sleeve and the surface of annular channel 70, and frictional forces generated between the sleeve 82 and the outer surface of tubular blank 80. The exact nature of sleeves of this type and their operation is presented in great detail in the abovenoted copending application of F. J. Fuchs, Jr. for Methods of an Apparatus for Hydrostatic Forming, Ser. No. 722,516, filed Mar. 20, 1968.

As discussed above, mandrel sleeve 36 is resiliently expandable within tubular blank 80, and its outer surface 37 is provided with a relatively rough, high friction surface so as to establish a tight fit therewith. Thus, the frictional engagement between the surface 37 of mandrel sleeve 36 and the interior of tubular blank 80 is so much greater than any frictional forces generated between the outer surface of tubular blank 80 and the inner surface of sleeve 82, that any movement of mandrel sleeve 36 is accompanied by a corresponding movement of tubular blank 80.

With full radial pressure now being exerted upon tubular blank 80 and with tubular blank 80 being fully and frictionally supported by mandrel rod 35 and mandrel sleeve 36, the present apparatus is ready for accomplishing the actual deformation of the material. The pressure being relieved in the downstream portion 33 of fluid chamber 29 (FIG. 4), additional fluid is pumped (by suitable means not shown) without downstream fluid opposition into the upstream portion 32 of fluid chamber 29 and into chamber 39. in that mandrel rod 35 and mandrel sleeve 36 are tightly engaged, the addition of fluid to upstream chamber portion 32 and chamber 39 causes a downstream displacement of rod piston 30, mandrel rod 35, sleeve piston 38 and mandrel 36 from the positions shown in FIG. 4 to the positions shown in FIG. 1. This downstream displacement of these elements, in turn, causes a corresponding downstream displacement of tubular blank 80 until the downstream edge of blank 80 engages the upstream surface of inner back-up die 118. Continued downstream advance of mandrel sleeve 36 causes blank 80 to flare radially outwardly into the die cavity 76 where it is confined between back-up dies 118 and 119 and die surface 73. At this stage of the operations, the radial pressure on the blank, in cooperation with the force of advance of the mandrel sleeve 36 being resisted by the force of the inner and outer back-up dies 118 and 119, causes the tubular blank material to be placed in a state of high hydrostatic-pressure, i.e., in a state of such increased ductility that the blank material is capable of plastic flow without fracture. Thus, continued downstream displacement of mandrel sleeve 36 causes the blank material to flow radially outwardly within die cavity 76 until the die cavity in its low volume configuration (FIG. 5) is filled with the highly ductile blank material. Thereafter, continued downstream advance of mandrel sleeve 36 causes highly ductile blank material to enter die cavity 76 in such an amount as to cause downstream displacement of the inner and outer back-up dies 118, 119 against the action of the high pressure fluid bearing against the inner and outer back-up die pistons 120, 121, respectively, until the downstream surfaces of the back-up die piston 120, 121 engage the upstream surfaces of shoulder 132 and stop ring 135, respectively.

Thus, it can be seen that the flow of the highly ductile blank material into die cavity 76 causes the inner and outer back-up dies 118, 119 to be displaced from their positions as shown in FIG. 5 to their positions as shown in FIG. 6. This displacement is accomplished against the back-up force generated by the high pressure fluid acting against the inner and outer back-up die pistons 120, 121 respectively. In this regard, the pressure of the high pressure fluid acting against the inner and outer back-up die pistons is selectively controllable by suitable valving (not shown) which can be of the types presently known to those skilled in this art.

It is to be further noted that inner back-up die 118 and its associated piston 120 are displaced by the flowing dutile blank material by an amount greater than the displacement of outer back-up die 119 and its associated piston. This is evident by comparing FIG. 5, wherein the upstream surface of inner back-up die 118 is shown as being substantially flush with the upstream surface of outer back-up die 119, with FIG. 6, wherein the upstream surface of inner back-up die 118 is positioned downstream from the upstream surface of outer back-up die 119. This difference in the degrees of displacement of the inner and outer back-up dies is to facilitate the formation of an inner face 91 (FIG. 6) on flange 90. It is accomplished by selectively defining the point of engagement of the downstream surface of inner and outer back-up die pistons 120, 121 with the upstream surface of concentric shoulder 132 and the upstream surface of annular stop ring 135, respectively.

Upon the completion of the formation of flange 90 on tubular blank 80, the introduction of pressurized fluid into the upstream portion 32 of fluid chamber 29 and into chamber 39 is terminated by suitable control means (not shown), the pressure on the high-pressure fluid in back-up die system 116 and in fluid chambers 102, 104, and 112 is relieved, and fluid at intermediate pressure is introduced to fluid chamber 98 from fluid line 100 through passage 99. The intermediate pressure thus introduced causes a radially outward displacement of pressure intensifier 85 and, upon engagement of upper surface 113 of intensifier piston 87, the radially outward displacement of pressure intensifier 85, clamp die piston 52 and clamp die 50 from the positions shown in FIG. 6 to the positions shown in FIG. 2.

With the elements of the apparatus so oriented, pressurized fluid is introduced through passage 43 in cylinder blank 13 to the downstream portion 33 of fluid chamber 29 so as to cause upstream displacement of rod piston 30 and therewith rod 35, and sleeve piston 30 and therewith rod 35, and sleeve piston 38 and therewith mandrel sleeve 36 from the positions shown in FIG. 1, to the positions shown in FIG. 4 and thereafter to the positions shown in FIG. 3. Such displacement moves the completed workpiece away from the inner and outer back-up dies and also causes disengagement of the mandrel sleeve 36 and mandrel rod 35 thereby allowing resilient contraction of mandrel sleeve 36 away from the inner surface of tubular blank 80 so as to allow the completed workpiece to be removed and a new tubular blank to be positioned for forming.

It will be understood by those skilled in the art that the foregoing step-by-step description of a flange forming cycle according to the present invention is merely for convenience of presentation and that in actual practice, the movement of the apparatus through the cycle is accomplished as a single smoothly sequenced operation.

It is to be further understood that the control apparatus (not shown) for controlling the admission, release and pressurization of fluids in the respective systems may be any of many apparatus known generally to those skilled in this art.

It will be manifest to those skilled in the art, that the foregoing is merely descriptive of the present invention and that many modifications and variations may be made to the disclosed apparatus without departing from the spirit and scope of the invention.

What is claimed is:

1. Apparatus for forming a flange on a tubular blank which comprises:
   an extrusion die;
   means for defining a variable size die cavity in communication with said die;
   low friction pressure transmitting means surrounding said tubular blank for applying radially directed pressure to said tubular blank in response to the exertion of force thereagainst;
   radially retractable means for applying a radially directed force against said low friction pressure transmitting means; and
   means for advancing said tubular blank into said variable size die cavity to cause said tubular blank to abut a surface of said variable size die cavity thereby to generate axial force against said tubular blank, which force, in cooperation with the application of said radially directed pressure, for placing the material of said tubular blank in a state of increased ductility and for causing said blank to flow within said variable size die cavity to form said flange.

2. Apparatus as claimed in claim 1 wherein said means for defining a variable size die cavity includes a fluid supported, displaceable back-up die.

3. Apparatus as claimed in claim 1 wherein said means for defining a variable size die cavity includes a plurality of fluid supported, displaceable back-up dies.

4. Apparatus as claimed in claim 1 wherein said radially retractable means includes a clamping die for holding said tubular blank against said means for advancing said tubular blank.

5. Apparatus as claimed in claim 1 wherein said radially retractable means includes a plunger for exerting pressure against said low friction pressure transmitting means.

6. Apparatus as claimed in claim 1 wherein said means for advancing said tubular blank includes a radially expandable mandrel including a mandrel rod and a mandrel sleeve mounted concentrically on said mandrel rod, said mandrel sleeve having an outer surface adapted for high frictional engagement with the inner surface of said tubular blank.

7. Apparatus as claimed in claim 3 wherein each of said plurality of fluid supported, displaceable back-up dies is generally cylindrical, and said cylindrical back-up dies are mounted coaxially and concentrically of one another.

8. Apparatus as claimed in claim 4 wherein said radially retractable means further includes a plunger reciprocably mounted in said clamping die, for exerting force upon a pressure transmitting medium for exerting pressure against said low friction pressure transmitting means.

9. Apparatus as claimed in claim 6 wherein said radially expandable mandrel is expandable and contractable in response to relative axial movement between said mandrel rod and said mandrel sleeve, said relative axial movement being generated by the selective exertion of fluid pressures upon pistons provided on each of said mandrel rod and said mandrel sleeve.

10. Apparatus for forming a flange on a tubular blank of solid plastic material, which comprises:
- a cylinder block;
- a machine block having an axially extending bore therethrough;
- means mounted in said cylinder block for reciprocably displacing a mandrel means within said axial bore in said machine block, said mandrel means for concentrically receiving said tubular blank thereon;
- a plurality of radial bores in said machine block extending radially outwardly from said axial bore;
- low friction pressure transmitting means for surrounding said tubular blank for establishing a pressure gradient in said tubular blank in response to the exertion of force thereagainst;
- a radial force ram apparatus mounted in each of said radial bores, said radial force ram apparatus including radially reciprocable means for applying a radially directed force against low friction pressure transmitting means, said radially reciprocable means being reciprocable between an advanced and a retracted position;
- back-up die means mounted in said axial bore of said machine block;
- means on said radially reciprocable means for defining an extrusion die when said radially reciprocable means is in said advanced position; and
- means on said radially reciprocable means for cooperating with said back-up die means to define a variable size die cavity in communication with said die;
- said means for reciprocably displacing said mandrel means also for advancing, with said mandrel means, said tubular blank into said variable size die cavity to cause said tubular blank to abut a surface of said variable size die cavity, thereby to generate axial force against said tubular blank which force, in cooperation with the application of said radially directed force to said low friction pressure transmitting means, places the material of said tubular blank in a state of increased ductility whereby, upon continued advance of said tubular blank the material thereof is caused to flow within said variable size die cavity to form said flange.

11. Apparatus as claimed in claim 10 wherein said mandrel means comprises an internally tapered expandable mandrel sleeve mounted concentrically on an externally tapered mandrel rod, and said means for reciprocably displacing said mandrel means comprises a first piston mounted on an end of said mandrel rod, a second piston mounted on an end of said mandrel sleeve, and fluid means for causing displacement of said pistons.

12. Apparatus as claimed in claim 10 wherein said radially reciprocable means includes:
- a clamping die for holding said tubular blank against said mandrel means; and
- a plunger, reciprocably mounted in said clamping die, for exerting force upon a pressure transmitting medium for exerting a radially directed pressure against said low friction pressure transmitting means.

13. Apparatus as claimed in claim 10 wherein said back-up die means comprises a plurality of fluid supported, displaceable back-up dies.

14. Apparatus as claimed in claim 13 wherein each of said plurality of fluid supported, displaceable back-up dies is generally cylindrical, and said cylindrical back-up dies are mounted coaxially and concentrically of one another.

15. Apparatus as claimed in claim 10 wherein said variable size die cavity increases in size in response to continued advancement of said tubular blank into said die cavity.

16. Apparatus for forming a projection on a member, which comprises:
- an extrusion die;
- means for defining a variable size die cavity in communication with said die;
- low friction pressure transmitting means for engaging said member and for applying pressure to said member in response to the exertion of force thereagainst;
- transversely retractable means for applying transversely directed force against said low friction pressure transmitting means; and
- high friction means for engaging and advancing said pressurized member slidably against said low friciton pressure transmitting means and through said extrusion die into said variable size die cavity to form said projection on said member.

17. Apparatus for forming a projection on a member which flows plastically when subjected to sufficiently high pressure, which comprises:
- an extrusion die;
- means for defining a variable size die cavity in communication with said die;
- low friction pressure transmitting means for surrounding said member for applying pressure to said member in response to the exertion of force thereagainst;
- transversely retractable means for applying transversely directed force against said low friction pressure transmitting means; and
- means for advancing said member into said variable size die cavity to cause said member to abut a surface of said variable size die cavity thereby to generate longitudinally acting force against said member, which force in cooperation with the application of said transversely applied pressure places at least a portion of said member in a plastic state and causes said member to flow within said variable size die cavity to form said projection.

References Cited
UNITED STATES PATENTS

| | | | |
|---|---|---|---|
| 2,344,285 | 3/1944 | Cormode | 72—354 |
| 2,743,691 | 5/1956 | Cuq | 72—60 |
| 2,877,675 | 3/1959 | Corbeels et al. | 72—354 |

RICHARD J. HERBST, Primary Examiner

U.S. Cl. X.R.

72—354, 270, 710